US009869126B2

(12) United States Patent
Evans

(10) Patent No.: US 9,869,126 B2
(45) Date of Patent: Jan. 16, 2018

(54) VARIABLE DIAMETER STATOR AND ROTOR FOR PROGRESSING CAVITY MOTOR

(71) Applicant: Nabors Drilling Technologies USA, Inc., Houston, TX (US)

(72) Inventor: Nigel Evans, Houston, TX (US)

(73) Assignee: NABORS DRILLING TECHNOLOGIES USA, INC., Houston, TX (US)

( * ) Notice: Subject to any disclaimer, the term of this patent is extended or adjusted under 35 U.S.C. 154(b) by 115 days.

(21) Appl. No.: 14/821,181

(22) Filed: Aug. 7, 2015

(65) Prior Publication Data

US 2016/0040480 A1  Feb. 11, 2016

Related U.S. Application Data

(60) Provisional application No. 62/035,586, filed on Aug. 11, 2014.

(51) Int. Cl.
| | |
|---|---|
| *F01C 1/10* | (2006.01) |
| *E21B 4/02* | (2006.01) |
| *E21B 3/00* | (2006.01) |
| *F04C 2/107* | (2006.01) |
| *F03C 2/08* | (2006.01) |
| *F04C 13/00* | (2006.01) |
| *B29L 31/34* | (2006.01) |
| *B29C 45/14* | (2006.01) |

(52) U.S. Cl.
CPC .................. *E21B 4/02* (2013.01); *E21B 3/00* (2013.01); *F03C 2/08* (2013.01); *F04C 2/1071* (2013.01); *F04C 13/008* (2013.01); *B29C 45/14491* (2013.01); *B29L 2031/34* (2013.01); *F04C 2230/602* (2013.01); *F04C 2250/20* (2013.01); *F04C 2250/30* (2013.01)

(58) Field of Classification Search
CPC . B29C 45/14491; B29L 2031/34; E21B 3/00; E21B 4/02; F03C 2/08; F03C 13/008; F03C 2230/602; F03C 2250/20; F03C 2250/30; F03C 2/1071
See application file for complete search history.

(56) References Cited

U.S. PATENT DOCUMENTS

| | | | | |
|---|---|---|---|---|
| 5,097,902 | A * | 3/1992 | Clark | F04C 13/008 166/106 |
| 5,722,820 | A * | 3/1998 | Wild | F04C 2/1073 418/153 |
| 6,183,226 | B1 * | 2/2001 | Wood | E21B 4/02 418/152 |
| 6,457,958 | B1 * | 10/2002 | Dunn | F04C 2/1071 418/1 |
| 2009/0087333 | A1 * | 4/2009 | McCrindle | F04C 2/10 418/61.3 |
| 2010/0133011 | A1 * | 6/2010 | Rushton | F03B 13/02 175/57 |

(Continued)

*Primary Examiner* — Jesse Bogue
(74) *Attorney, Agent, or Firm* — Adolph Locklar

(57) ABSTRACT

A mud motor for use in a wellbore may include a stator and rotor. The tolerance between the stator and rotor may be varied along the length of the mud motor to, for example, reduce wear of the stator at predetermined locations. The tolerance may range from an interference fit to a clearance fit. The tolerance may vary multiple times across the length of the mud motor.

12 Claims, 3 Drawing Sheets

(56) References Cited

U.S. PATENT DOCUMENTS

| | | | |
|---|---|---|---|
| 2010/0329913 A1* | 12/2010 | Ree | F04C 13/00 |
| | | | 418/48 |
| 2013/0175093 A1* | 7/2013 | Taylor | F04B 47/08 |
| | | | 175/57 |
| 2014/0158426 A1* | 6/2014 | Hay | E21B 4/02 |
| | | | 175/17 |
| 2014/0332272 A1* | 11/2014 | Gawski | E21B 17/003 |
| | | | 175/57 |
| 2015/0354280 A1* | 12/2015 | Downton | E21B 4/02 |
| | | | 175/107 |
| 2016/0177773 A1* | 6/2016 | Chochua | F01D 17/10 |
| | | | 415/148 |
| 2016/0195087 A1* | 7/2016 | Downton | E21B 4/02 |
| | | | 175/57 |
| 2016/0341197 A1* | 11/2016 | Tanaka | F04C 2/1071 |

\* cited by examiner

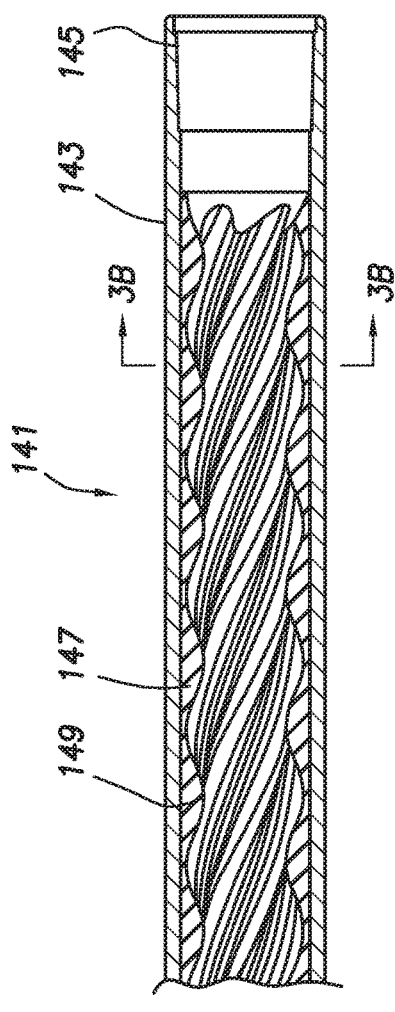
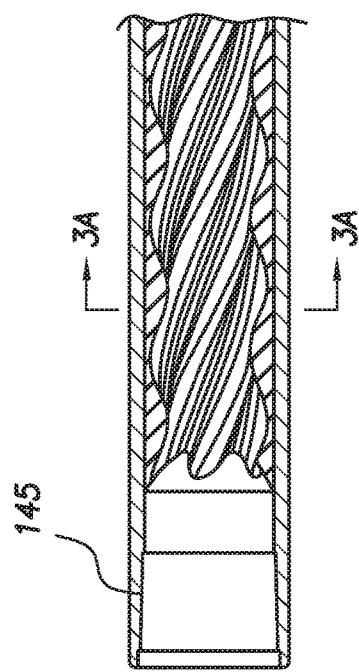
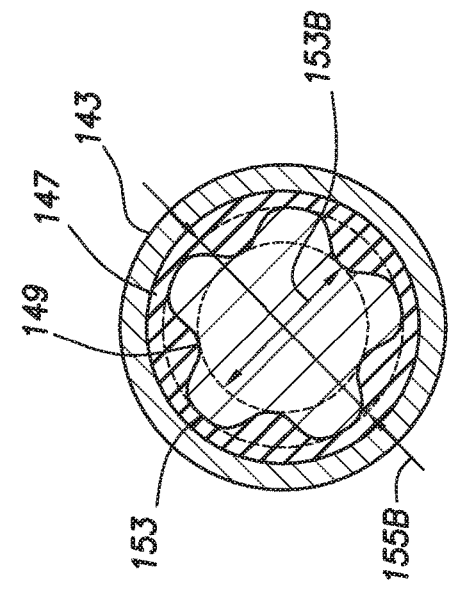
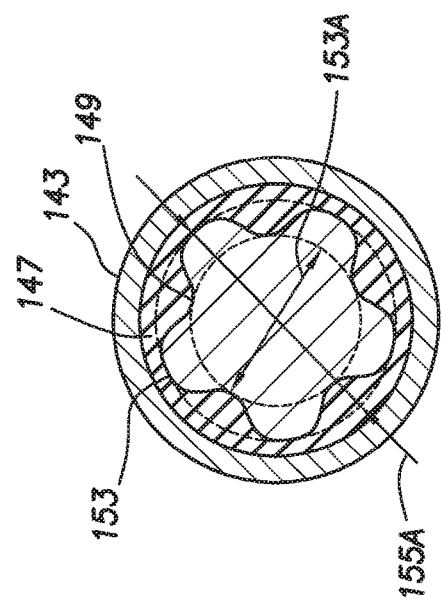
FIG. 3
FIG. 3A
FIG. 3B

VARIABLE DIAMETER STATOR AND ROTOR FOR PROGRESSING CAVITY MOTOR

CROSS-REFERENCE TO RELATED APPLICATIONS

This application is a nonprovisional application which claims priority from U.S. provisional application No. 62/035,586, filed Aug. 11, 2014, the entirety of which is hereby incorporated by reference.

TECHNICAL FIELD/FIELD OF THE DISCLOSURE

The present disclosure relates generally to components of progressing cavity pumps, and specifically to the stator and rotor of a progressing cavity pump used to provide rotation to a downhole tool.

BACKGROUND OF THE DISCLOSURE

When drilling a wellbore, a drill bit is generally attached to the bottom of a drill string. For some wellbores, especially highly deviated or horizontal wells, rather than rotating the entire drill string from the surface, a motor located near the drill bit may be used to rotate the drill bit and, in some instances, power downhole equipment. In some downhole motors, a progressing cavity pump (also known as a progressive cavity pump, eccentric screw pump, cavity pump, or Moineau pump) may be utilized to, as drilling fluids are pumped therethrough, rotate the drill bit. As understood in the art, a progressing cavity pump is a positive displacement pump which includes a stator and rotor. The rotor has one or more generally helical outer profiles extending down its length. The stator has two or more generally helical inner profiles extending down its length. The helical outer profile of the rotor and the helical inner profile of the stator are configured to allow, as the rotor eccentrically rotates within the stator, form a series of cavities down the length of the progressing cavity pump. When the rotor is driven, the progressing cavity pump serves to pump a fluid. Alternatively, by externally pumping a fluid through the progressing cavity pump, the rotor of the pump rotates, allowing rotational power to be extracted from the flow. When used as part of a drilling string, such motors, commonly known as drilling or mud motors, utilize the flow of a drilling fluid through the drill string to rotate downhole equipment, sometimes including the drill bit.

In many progressing cavity pumps, the stator includes an outer cover and inner elastomeric layer which is molded between the interior of the outer cover and a core, the core being a negative mold of the desired profile of the interior of the stator. The use of the elastomeric layer may serve to simplify construction of the stator as well as allow for reactive movement of the interior profile of the stator to, for example, create an interference fit against the rotor or to allow relatively large solid particles (including, for example and without limitation, lost circulation material) to pass therethrough while minimizing damage to the stator. Generally, the tighter the fit between the stator and rotor, the more power can be extracted from the movement of drilling fluid therethrough. However, depending on the temperature, content of fluid passing through the progressing cavity pump including solid particles or abrasive or corrosive compounds, swelling or contracting of pump components, and the fit between the stator and rotor, the elastomeric layer may be eroded or worn.

Additionally, because of the eccentric rotation of the rotor within the stator, a transmission mechanism, often a constant velocity joint, is used to convert the eccentric rotation of the rotor into a rotation concentric with the drill bit. The eccentricity of motion of the rotor may be affected by this transmission mechanism and cause additional wear in locations of the stator near the transmission mechanism. Furthermore, where the transmission mechanism is near a point of flexure in the drill string, such as at a bent sub, the eccentricity may be further increased.

SUMMARY

The present disclosure provides for a mud motor for use in a wellbore. The mud motor may include a rotor. The rotor may include at least one generally helical rotor lobe extending therefrom. The mud motor may also include a stator. The stator may be generally tubular in shape. The stator may include at least two generally helical stator lobes extending inward from an inner surface thereof. The at least two generally helical stator lobes may be adapted to interface with the at least one generally helical rotor lobe to create at least one cavity between the stator and the rotor such that the cavity traverses the length of the stator as the rotor eccentrically rotates within the stator. The distance between the stator and the rotor at a given point along the mud motor defining a tolerance, the tolerance at a first point along the mud motor being larger than the tolerance at a second point along the mud motor.

The present disclosure also provides for a stator for a mud motor for use in a wellbore. The stator may include an outer cover, the outer cover being generally tubular. The stator may also include a stator insert. The stator insert may be generally tubular in shape and may include at least two generally helical stator lobes extending inward from an inner surface of the outer cover. The at least two generally helical stator lobes may be adapted to interface with at least one generally helical rotor lobe of a rotor to create at least one cavity between the stator and the rotor such that the cavity traverses the length of the stator as the rotor eccentrically rotates within the stator. The at least two stator lobes may define a first major stator diameter and a first minor stator diameter at a first point along the stator and a second major stator diameter and a second minor stator diameter at a second point along the stator. At least one of the first major stator diameter and the first minor stator diameter may be larger than the second major stator diameter and the second minor stator diameter respectively.

The present disclosure also provides for a method of forming a stator for use in a mud motor. The method may include providing an outer cover. The outer cover may be generally tubular. The method may also include providing a mold core. The mold core may include an outer profile, the outer profile being the negative of a stator inner profile. The stator inner profile may include at least two generally helical stator lobes extending inward from an inner surface of the outer cover. The at least two generally helical stator lobes may be adapted to interface with at least one generally helical rotor lobe of a rotor to create at least one cavity between the stator and the rotor such that the cavity traverses the length of the stator as the rotor eccentrically rotates within the stator. The at least two stator lobes may define a first major stator diameter and a first minor stator diameter at a first point along the stator and a second major stator diameter and a second minor stator diameter at a second point along the stator. At least one of the first major stator diameter and the first minor stator diameter may be larger than the second major stator diameter and the second minor stator diameter respectively. The method may also include positioning the mold core within the outer cover. The method may also include injecting an elastomer between the outer cover and the mold core, the elastomer adapted to couple to the inner surface of the outer cover and retain the stator inner profile. The method may also include hardening the elastomer. The method may also include removing the mold core from the outer cover.

The present disclosure also provides for a method of forming a stator for use in a mud motor. The method may include providing an outer cover, the outer cover being generally tubular. The method may also include forming, in the outer cover, a stator inner profile. The stator inner profile may include at least two generally helical stator lobes extending inward. The at least two generally helical stator lobes may be adapted to interface with at least one generally helical rotor lobe of a rotor to create at least one cavity between the stator and the rotor such that the cavity traverses the length of the stator as the rotor eccentrically rotates within the stator. The at least two stator lobes may define a first major stator diameter and a first minor stator diameter at a first point along the stator and a second major stator diameter and a second minor stator diameter at a second point along the stator. At least one of the first major stator diameter and the first minor stator diameter may be larger than the second major stator diameter and the second minor stator diameter respectively.

The present disclosure also provides for a method of assembling a mud motor. The method may include providing a mud motor stator. The method may also include providing a rotor. The rotor may include at least one generally helical rotor lobe extending therefrom. The rotor may have a first major rotor diameter and a first minor rotor diameter at a first point along the rotor and a second major rotor diameter and a second minor rotor diameter at a second point along the rotor. At least one of the first major rotor diameter and the first minor rotor diameter may be smaller than the second major rotor diameter and the second minor rotor diameter respectively. The method may also include positioning the rotor within the stator.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 3 is a cross section view of a stator of a mud motor consistent with embodiments of the present disclosure.

FIG. 3A is a cross section view of the stator of FIG. 3 taken at line C-C.

FIG. 3B is a cross section view of the stator of FIG. 3 taken at line D-D.

DETAILED DESCRIPTION

Figure 1:
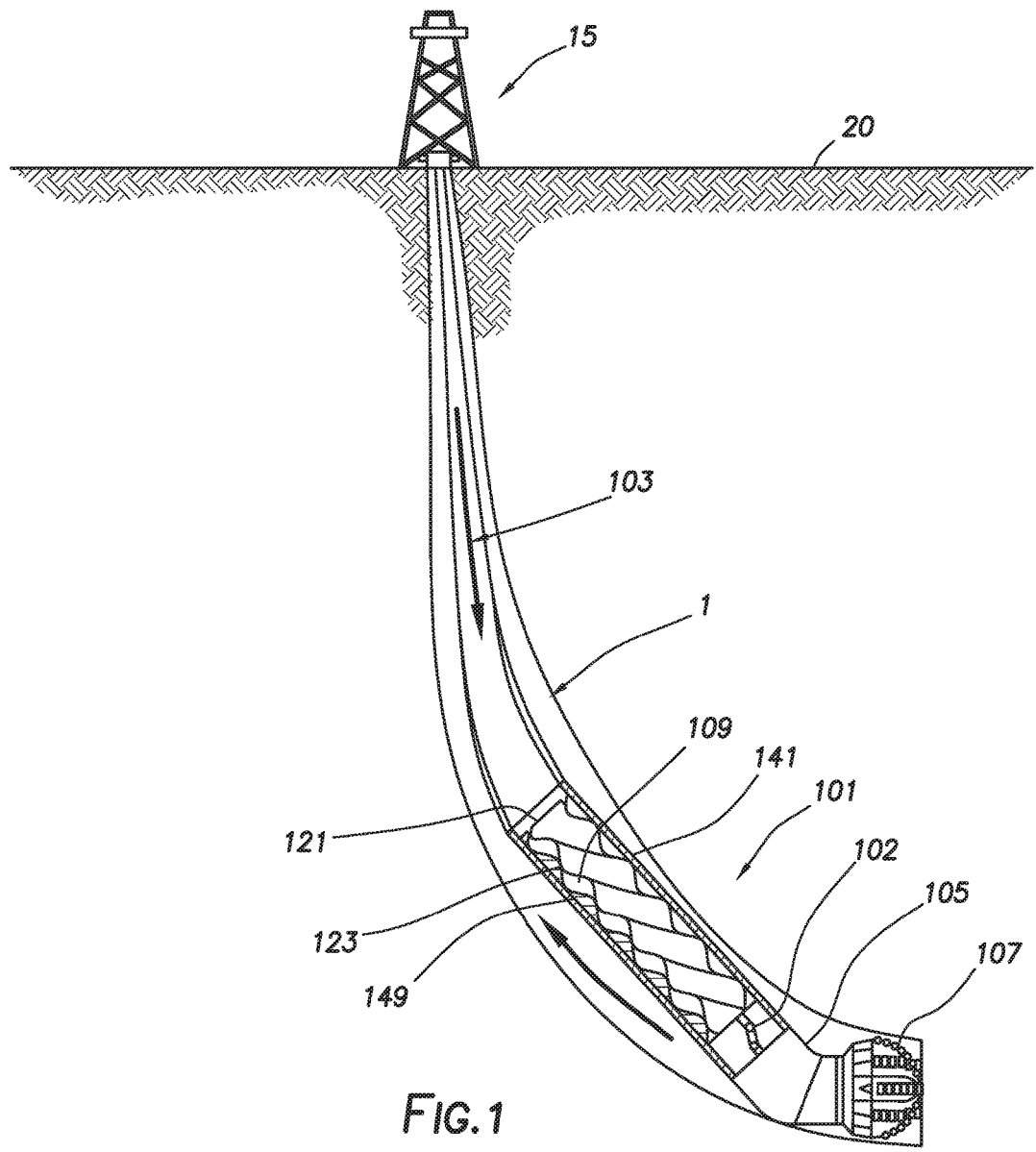
FIG. 1 is a view of a drill string using a mud motor consistent with embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts a drilling operation utilizing mud motor 101 consistent with embodiments of the present disclosure. In some embodiments, mud motor 101 (shown here in cross section) is included as a part of drilling string 1 used to drill wellbore 10 from drilling rig 15 at the surface 20. Mud motor 101 may include rotor 121 and stator 141, each discussed hereinbelow. Rotor 121 may be coupled to transmission mechanism 102, here shown as a constant velocity joint. Transmission mechanism 102 may be adapted to convert the eccentric rotation of rotor 121 into a concentric rotation. Rotor 121 may be rotated within stator 141 by drilling fluid pumped through drilling string 1 in the direction of arrow 103.

Transmission mechanism 102 may additionally pass the concentric rotation to additional downhole equipment below mud motor 101. In some embodiments, the downhole equipment may include one or more of, for example and without limitation, a generator, additional transmission mechanisms, bent sub 105, and/or drill bit 107. In some embodiments, rotational power from mud motor 101 may be used to rotate drill bit 107, allowing drilling string 1 to extend wellbore 10. Although not depicted, one having ordinary skill in the art with the benefit of this disclosure will understand that an additional transmission mechanism may be positioned on the other end of rotor 121 and may serve to couple the rotation of rotor 121 to additional downhole equipment above mud motor 101.

Figure 2:
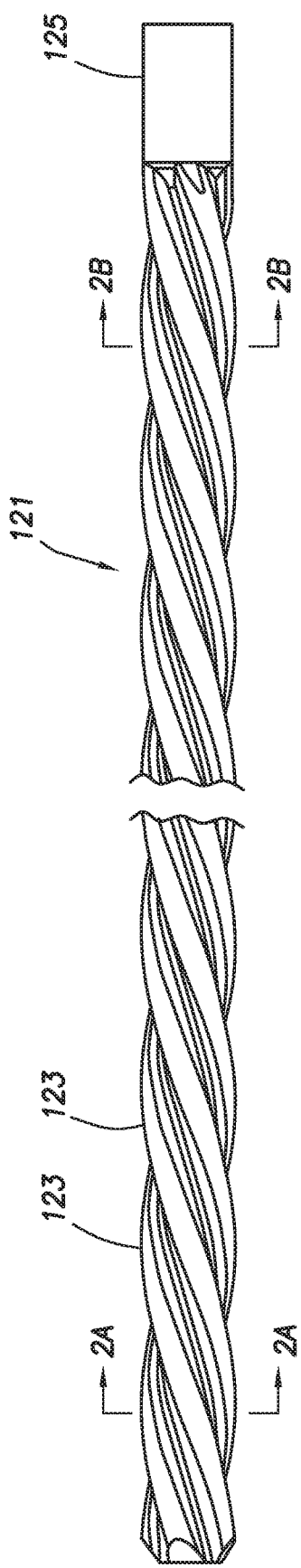
FIG. 2 is a side view of a rotor of a mud motor consistent with embodiments of the present disclosure.
Figure 2B:
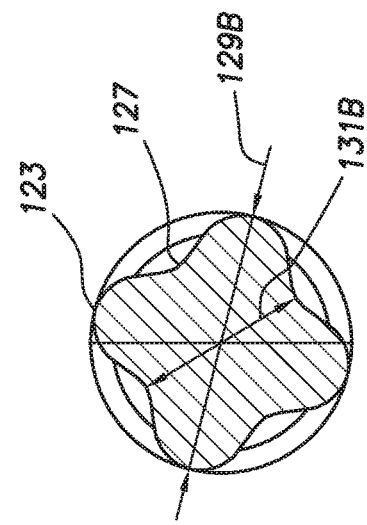
FIG. 2B is a cross section view of the rotor of FIG. 2 taken at line B-B.
Figure 2A:
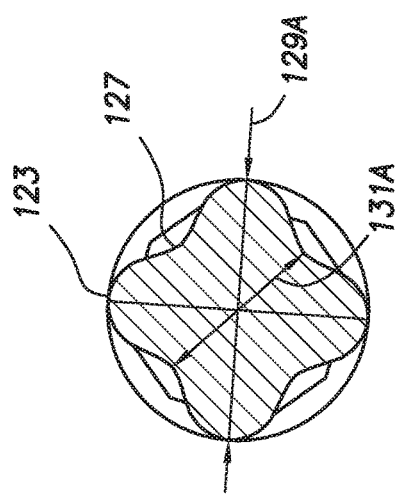
FIG. 2A is a cross section view of the rotor of FIG. 2 taken at line A-A.

FIG. 2 depicts rotor 121 consistent with embodiments of the present disclosure. Rotor 121 may include one or more rotor lobes 123 (depicted here as four) defining generally helical projections extending along the length of rotor 121. In some embodiments, one or both ends of rotor 121 may include coupler 125 adapted to allow rotor 121 to couple to a transmission mechanism as previously described. As depicted in FIGS. 2A, 2B, between rotor lobes 123 are defined rotor valleys 127 to form a generally continuous outer curvature in cross section. As rotor 121 rotates, rotor lobes 123 move in a circle at a distance from the center of rotor 121 defining major rotor diameter 129A, 129B. Likewise, rotor valleys 127 move in a circle at a distance from the center of rotor 121 defining minor rotor diameter 131A, 131B.

FIG. 3 depicts stator 141 consistent with embodiments of the present disclosure. Stator 141 may include outer cover 143. Outer cover 143 may be a generally tubular member, and may include a coupler 145 at one or both ends adapted to allow stator 141 to couple to other components of drill string 1 (not shown). In some embodiments, stator 141 may also include stator insert 147. Stator insert 147 may be formed from an elastomeric material against the inner wall of outer cover 143. Stator insert 147 may be formed to include two or more stator lobes 149 (here depicted as five) defining generally helical projections extending along the length of stator 141. As depicted in FIGS. 3A, 3B, between stator lobes 149 are defined stator valleys 151 to form a generally continuous inner curvature in cross section. Stator lobes 149 are positioned to extend into the interior of stator 141 a distance defining a minor stator diameter 153A, 153B. Likewise, stator valleys 151 are positioned at a major stator diameter 155A, 155B. In some embodiments, stator lobes 149 may be formed at least partially as a part of outer cover 143. In some embodiments, stator 141 may be formed from a single material such as, for example and without limitation, steel or any other metal. In some embodiments, stator insert 147 may be a liner of generally uniform thickness on the inner surface of stator lobes 149 formed in outer cover 143.

As depicted in FIG. 1, stator lobes 149 are adapted to interface with rotor lobes 123 to create one or more cavities 109 between stator 141 and rotor 121 which, as rotor 121 eccentrically rotates within stator 141, progress the length of mud motor 101 as understood in the art. Cavities 109 are formed between places along mud motor 101 at which stator 141 and rotor 121 are in close proximity and may generally form a seal. By varying the major and minor diameters of stator 141 and rotor 121, the distance, defined as the tolerance, between stator lobes 149 and rotor lobes 123 as rotor 121 rotates through stator 141 may be selected. In some embodiments of the present disclosure, the tolerance between stator 141 and rotor 121 may vary along the length of mud motor 101.

For example, with respect to FIGS. 2A, 2B, in some embodiments of the present disclosure, one or more of the major and minor rotor diameters of rotor 121 may vary based on the position along rotor 121. For example, at a position designated by line A-A on rotor 121, major rotor diameter 129A and minor rotor diameter 131A may be larger than major rotor diameter 129B and minor rotor diameter 131B at a position designated by line B-B on rotor 121. Although depicted as being at or near opposite ends of rotor 121, one having ordinary skill in the art with the benefit of this disclosure will understand that the two points designated by lines A-A and B-B may be located at any point along rotor 121. When installed into a stator having constant major and minor stator diameters, the tolerance between the stator and rotor 121 may vary depending on the position on mud motor 101.

In some embodiments, with respect to FIGS. 3A, 3B, one or more of the major and minor stator diameters of stator 141 may vary based on the position along stator 141. For example, at a position designated by line C-C on stator 141, major stator diameter 155A and minor stator diameter 153A may be larger than major stator diameter 155B and minor stator diameter 153B at a position designated by line D-D on stator 141. Again, although depicted as being at or near opposite ends of rotor 121, one having ordinary skill in the art with the benefit of this disclosure will understand that the two points designated by lines C-C and D-D may be located at any point along stator 141. When a rotor having a constant major and minor rotor diameters, the tolerance between stator 141 and the rotor may vary depending on the position on mud motor 101.

In some embodiments, both stator 141 and rotor 121 may include variations in major and minor diameters along their length. For example, in some embodiments, over the length of stator 141 and rotor 121, the tolerance may change based on, for example and without limitation, an increase in major and minor diameters of stator 141 and a decrease in major and minor diameters of rotor 121. In some embodiments, the major and minor diameters of both rotor 121 and stator 141 may decrease, causing cavities 109 to decrease in volume along the length of stator 141 and rotor 121. In such an embodiment, the tolerance may still be varied at different points along stator 141 and rotor 121.

In some embodiments, the tolerance may range from an interference fit to a clearance fit.

In some embodiments, the tolerance at a given point along mud motor 101 as created by variations in one or more of the major and/or minor diameters of rotor 121 and stator 141 may be preselected based on anticipated wear at that point along stator insert 147. For example and without limitation, in some embodiments of the present disclosure, tolerance between rotor 121 and stator 141 may be widened near to transmission mechanism 102. In some embodiments, as depicted in FIG. 1, transmission mechanism 102 may be coupled to downhole equipment such as bent sub 105 which may cause increased or uneven eccentricity of rotation of rotor 121. By widening the tolerance by, for example, one or more of increasing major and minor stator diameters or decreasing major and minor rotor diameters, the added eccentricity may result in less wear on stator insert 147. At the same time, as previously discussed, a closer tolerance for other positions along mud motor 101 may allow for larger amounts of power extraction for mud motor 101 when compared to a mud motor utilizing the wider tolerances near transmission mechanism 102.

In some embodiments, tolerance between rotor 121 and stator 141 may vary from close to wide at multiple points along mud motor 101. For example, in some embodiments of the present disclosure, both ends of mud motor 101 may utilize a generally wider tolerance than the middle of mud motor 101. In other embodiments, multiple regions of generally wider tolerance may be included along mud motor 101 between areas of generally tighter tolerance. For example and without limitation, for a mud motor 101 expected to endure a large amount of bend in a deviated wellbore, a portion through the middle of mud motor 101 may have a wider tolerance than adjoining regions on either side thereof.

In some embodiments, by anticipating potential wear locations caused by, for example and without limitation, anticipated temperature changes, drilling fluid content and properties, and swelling or contraction of components of mud motor 101, areas of wider tolerance may be formed throughout mud motor 101. In some embodiments, wear locations may be determined by empirical observation of a mud motor already having been used.

In some embodiments, stator insert 147 may be formed between outer cover 143 and a mold core, the mold core having an outer profile generally corresponding to the desired inner profile of stator insert 147. The mold core may thus have a profile corresponding to the inner profile of a stator having varying major and minor diameters at different points along the length of the resulting stator insert. An elastomeric material may then be molded into the space therebetween. Utilizing a mold core may allow for repeatable stator construction.

Rotor 121 may be formed by any method known in the art. For example and without limitation, rotor 121 may be formed utilizing a computer numerical control (CNC) mill or lathe.

In some embodiments, outer cover 143 may be formed having a generally cylindrical inner surface. One having ordinary skill in the art with the benefit of this disclosure will understand that outer cover 143 may be formed in generally any shape, including, but not limited to, cylindrical, square, or hexagonal in cross section without deviating from the scope of this disclosure. In some embodiments, outer cover 143 may include an inner surface having lobes formed therein generally corresponding to the desired inner profile of stator insert 147. In some such embodiments, stator insert 147 may be of uniform radial thickness. In some embodiments, stator insert 147 may be of varying radial thickness. In some embodiments, stator insert 147 may be omitted, with outer cover 143 directly contacting rotor 121.

In some embodiments, mud motor 101 may be formed from a standard, non-tolerance shifting, or uniform diameter stator 141 with rotor 121 having variations in diameter as previously discussed. Thus, a standard mud motor may be converted to a mud motor as described herein by replacing its rotor with a rotor 121 as described herein. In other embodiments, mud motor 101 may be formed from a standard, non-tolerance shifting or uniform diameter rotor 121 with stator 141 having variations in diameter as previously discussed.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A mud motor for use in a wellbore, the mud motor comprising:
   a rotor, the rotor including at least one helical rotor lobe extending therefrom;
   a stator, the stator being tubular in shape and including at least two helical stator lobes extending inward from an inner surface thereof, the at least two helical stator lobes interfacing with the at least one helical rotor lobe to create at least one cavity between the stator and the rotor such that the cavity traverses the length of the stator as the rotor eccentrically rotates within the stator;
   wherein the distance between the stator and the rotor at an interface between the at least two helical stator lobes and the at least one helical rotor lobe at a given point along the mud motor defines a tolerance; and
   wherein the rotor and the stator are formed such that the tolerance at a first point along the mud motor is wider than the tolerance at a second point along the mud motor, wherein the first point along the mud motor is positioned nearer the upper end of the mud motor than the second point along the mud motor.

2. The mud motor of claim 1, wherein the rotor comprises a first major rotor diameter and a first minor rotor diameter at a first point along the rotor corresponding with the first point along the mud motor and a second major rotor diameter and a second minor rotor diameter at a second point along the rotor corresponding with the second point along the mud motor, and at least one of the first major rotor diameter and the first minor rotor diameter is smaller than the second major rotor diameter and the second minor rotor diameter respectively.

3. The mud motor of claim 1, wherein the stator comprises a first major stator diameter and a first minor stator diameter at a first point along the stator corresponding with the first point along the mud motor and a second major stator diameter and a second minor stator diameter at a second point along the stator corresponding with the second point along the mud motor, and at least one of the first major stator diameter and the first minor stator diameter is larger than the second major stator diameter and the second minor stator diameter respectively.

4. The mud motor of claim 1, wherein the stator comprises an outer cover and a stator insert, the outer cover being tubular, and the stator insert being formed within the outer cover and including the at least two helical stator lobes.

5. A mud motor for use in a wellbore, the mud motor comprising:
   a rotor, the rotor including at least one helical rotor lobe extending therefrom;
   a stator, the stator being tubular in shape and including at least two helical stator lobes extending inward from an inner surface thereof, the at least two helical stator lobes interfacing with the at least one helical rotor lobe to create at least one cavity between the stator and the rotor such that the cavity traverses the length of the stator as the rotor eccentrically rotates within the stator;
   wherein the distance between the stator and the rotor at an interface between the at least two helical stator lobes and the at least one helical rotor lobe at a given point along the mud motor defines a tolerance; and
   wherein the rotor and the stator are formed such that:
      the tolerance at a first point along the mud motor is wider than the tolerance at a second point along the mud motor; and
      the tolerance at a third point along the mud motor is wider than the tolerance at the second point along the mud motor;
      wherein the second point along the mud motor is positioned between the first point along the mud motor and the third point along the mud motor.

6. The mud motor of claim 5, wherein the rotor comprises a first major rotor diameter and a first minor rotor diameter at a first point along the rotor corresponding with the first point along the mud motor and a second major rotor diameter and a second minor rotor diameter at a second point along the rotor corresponding with the second point along the mud motor, and at least one of the first major rotor diameter and the first minor rotor diameter is smaller than the second major rotor diameter and the second minor rotor diameter respectively.

7. The mud motor of claim 5, wherein the stator comprises a first major stator diameter and a first minor stator diameter at a first point along the stator corresponding with the first point along the mud motor and a second major stator diameter and a second minor stator diameter at a second point along the stator corresponding with the second point along the mud motor, and at least one of the first major stator diameter and the first minor stator diameter is larger than the second major stator diameter and the second minor stator diameter respectively.

8. The mud motor of claim 5, wherein the stator comprises an outer cover and a stator insert, the outer cover being tubular, and the stator insert being formed within the outer cover and including the at least two helical stator lobes.

9. A mud motor for use in a wellbore, the mud motor comprising:
   a rotor, the rotor including at least one helical rotor lobe extending therefrom;

a stator, the stator being tubular in shape and including at least two helical stator lobes extending inward from an inner surface thereof, the at least two helical stator lobes interfacing with the at least one helical rotor lobe to create at least one cavity between the stator and the rotor such that the cavity traverses the length of the stator as the rotor eccentrically rotates within the stator;

wherein the distance between the stator and the rotor at an interface between the at least two helical stator lobes and the at least one helical rotor lobe at a given point along the mud motor defines a tolerance; and wherein the rotor and the stator are formed such that:
  the tolerance at a first point along the mud motor is wider than the tolerance at a second point along the mud motor; and
  the tolerance at a third point along the mud motor is tighter than the tolerance at the first point along the mud motor;
  wherein the first point along the mud motor is positioned between the second point along the mud motor and the third point along the mud motor.

10. The mud motor of claim 9, wherein the rotor comprises a first major rotor diameter and a first minor rotor diameter at a first point along the rotor corresponding with the first point along the mud motor and a second major rotor diameter and a second minor rotor diameter at a second point along the rotor corresponding with the second point along the mud motor, and at least one of the first major rotor diameter and the first minor rotor diameter is smaller than the second major rotor diameter and the second minor rotor diameter respectively.

11. The mud motor of claim 9, wherein the stator comprises a first major stator diameter and a first minor stator diameter at a first point along the stator corresponding with the first point along the mud motor and a second major stator diameter and a second minor stator diameter at a second point along the stator corresponding with the second point along the mud motor, and at least one of the first major stator diameter and the first minor stator diameter is larger than the second major stator diameter and the second minor stator diameter respectively.

12. The mud motor of claim 9, wherein the stator comprises an outer cover and a stator insert, the outer cover being tubular, and the stator insert being formed within the outer cover and including the at least two helical stator lobes.

\* \* \* \* \*